United States Patent [19]
Martin et al.

[11] Patent Number: 5,371,591
[45] Date of Patent: Dec. 6, 1994

[54] TRIAXIAL SPLIT-GAIN RING LASER GYROSCOPE

[75] Inventors: Graham J. Martin, Woodland Hills; Leo K. Lam, Calabasas, both of Calif.

[73] Assignee: Litton Systems, Inc., Beverly Hills, Calif.

[21] Appl. No.: 570,839

[22] Filed: Aug. 13, 1990

[51] Int. Cl.⁵ ............................................. G01B 9/02
[52] U.S. Cl. ........................................ 356/350; 372/94
[58] Field of Search ........................... 356/350; 372/94

[56] References Cited

U.S. PATENT DOCUMENTS

| | | | |
|---|---|---|---|
| 3,411,849 | 11/1968 | Aronowits | 372/94 |
| 3,826,575 | 7/1974 | Walter | 356/106 |
| 4,247,832 | 1/1981 | Sanders et al. | 356/350 |
| 4,329,057 | 5/1982 | Zampiello | 356/350 |
| 4,482,249 | 11/1984 | Smith et al. | 356/350 |
| 4,616,930 | 10/1986 | Martin | 372/94 |
| 4,813,774 | 3/1989 | Dorschner et al. | 356/350 |

OTHER PUBLICATIONS

J. D. Coccoli; "An Overview of Laser Gyros"; Charles Start Dragrer Lab., Inc., Aug. 1978, pp. 1–43.

Chaw et al.; "Multioscillator Laser Gyros"; IEEE Jour. Quat. Elect., vol. QE-16, #9, Sep. 1980, pp. 918–936.

*Primary Examiner*—Nelson Moskowitz
*Attorney, Agent, or Firm*—Elliott N. Kramsky

[57] ABSTRACT

A triaxial multioscillator for operation in accordance with a mode of operation requiring the imposition of a substantially uniform axial magnetic field on the gain region of each lasing cavity. An integral frame of glass ceramic material has a rhombic dodecahedral shape and includes three closed lasing cavities, each formed of four straight segments. The cavities include three mutually parallel segments, one from each cavity, that are regularly spaced on a circle perpendicular to the axis of the frame. An internal cathode and six anodes are associated with the frame to provide gain in each of such three segments. The frame is positioned within a closed cylindrical element of soft iron composition by means of a fixture. The fixture positions magnets adjacent the top and bottom of the element to generate parallel lines of magnetic flux therein. The frame is positioned within the container in such a way that the cavity segments containing the three gain regions are aligned with the parallel lines of flux to produce the requisite axial fields in the three gain regions.

11 Claims, 5 Drawing Sheets

TRIAXIAL SPLIT-GAIN RING LASER GYROSCOPE

BACKGROUND

1. Field of the Invention

The present invention relates to systems for sensing rotation that operate upon the interaction of counterpropagating beams of light within a cavity. More particularly, this invention pertains to a system for simultaneously sensing rotation about three orthogonal axes in which an axial magnetic field is imposed simultaneously upon the gain region within each of three lasing cavities.

2. Description of the Prior Art

U.S. patent application Ser. No. 115,018 of Graham J. Martin filed Oct. 28, 1987 entitled "Split Gain Multimode Ring Laser Gyroscope and Method" discloses a clear path, undithered multioscillator ring laser gyroscope. To a large extent the device and method of that invention provide an improvement over previous multioscillator designs by utilizing the concept of selected mode repression applying an axial magnetic field to the gain medium in a non-planar cavity, thus avoiding any intracavity elements.

Multioscillators belong to a class of ring laser gyroscopes in which stability problems are minimized by allowing four modes to lase within the device's cavity. This creates, in effect, two gyro beam pairs, one left circularly polarized and the other right circularly polarized. The lasing modes of a conventional multioscillator are configured so that two gyros, each comprising a pair of counterpropagating beams, simultaneously exists within the (single) cavity. The resulting sum of the beat outputs provides a signal that is doubly sensitive to input rotation and substantially insensitive to Faraday bias changes.

The type of multioscillator described in the referenced patent application comprises a clear path Sagnac ring rotation sensor that includes means for adjusting the gain medium to provide a frequency shift between selected gain curve centers. Such a frequency shift between the centers "suppresses" the lasing action of selected modes in the cavity to prevent frequency locking. The actual lasing frequencies of the cavity modes are not substantially changed by this frequency shifting.

The described multioscillator concept provides, in effect, a non-reciprocal bias in a four mode laser gyro by utilizing a large axial magnetic field without incurring the disadvantages of prior multioscillator designs such as the well-known ZEELAG (Zeeman Laser Gyro). Furthermore, such a device has such a large bias that back scatter effects become secondary.

Navigation systems must measure space-dependent variables, such as rotation, with respect to (or about) a set of three orthogonal axes. The realization of the many advantages of a multioscillator or any other rotation sensor, ring laser or otherwise, must address problems inherent in attempting to achieve a practical device that is simultaneously sensitive to rotating about three measuring or input axes. The design of a navigation system that is sufficiently compact and realizable in a manufacturing sense is beset by numerous difficulties. In the operation of a ring laser, the chosen fill gases must interact with applied electrical fields to produce lasing action. Thus the design of any ring laser gyroscope must provide for the positioning of anodes and cathodes in addition to properly locating mirror faces and internal bores.

Additional design problems are posed by a device whose operation relies upon the generation of current flows in a gaseous medium. Unavoidable gas flows within a laser cavity can prove quite deleterious to the operation of the device. So-called Langmuir flow effects can degrade laser performance considerably, producing inter alia unwanted thermal bias. Such effects have been compensated to varying extents in some single axis devices by the symmetrical placement of a plurality of electrodes about the body of the instrument. Generally, this implies the use of numerous electrodes. See, for example, the United States patents of Dorschner et al. (U.S. Pat. No. 4,229,106) and Smith et al. (U.S. Pat. No. 4,585,501).

The United States patents of Stiles et al., (U.S. Pat. No. 4,477,188) and Simms (U.S. Pat. No. 4,407,583) disclose the incorporation of three planar gyro cavities into a single block. The expansion of a ring laser concept to a unit for measuring rotation about three orthogonal axes necessarily complicates the problem of providing a suitable arrangement of electrodes. The Stiles et al. device utilizes six anodes and two cathodes while the Simms apparatus includes six anodes and a single cathode. The use of a considerable number of electrodes substantially complicates instrument design. Each electrode must be sealably secured to (or within) the gyro frame in such a manner that the device remains airtight. This may add significant difficulties in fabrication.

The physical size of the electrodes also complicate design. A large number of electrodes will consume a correspondingly-large percentage of the frame's surface mounting area. The size and shape of the block-frame may not be sufficiently reducible to prevent arcing or other unwanted electrical interactions. Thus, the design of a ring laser rotational rate sensor that is sensitive to rotation about three orthogonal axes is significantly complicated by unavoidable effects of gas flow.

In addition to the problems associated with placement of electrodes, the realization of a triaxial multioscillator in accordance with the teachings of the above-referenced patent application is further complicated by the requirement of an axial magnetic field for adjusting the separation between the centers of the gain media within each of the rotation-sensing cavities of the multioscillator. The single axis device disclosed in the referenced patent application alternately employs difficult-to-machine frame cutout regions and six-post magnet arrangements to encompass the gain region as required. Such designs are complex in the case of a single axis gyro. Their extension to three axes, even if possible, would result in a device of extreme complexity and cost. Undoubtedly, the extrapolation of such concepts to a triax design would introduce interactions between the axial fields for the three axes that could result in error-causing transverse components, an effect particularly noticeable in smaller path length designs.

The capabilities (i.e. sensitivity) and price of a triaxial rotation sensor are functions of the size of the block-frame. Any design that demands added surface area for separation of electrodes necessarily adds to the cost of the instrument. Such added cost partially defeats the compactness advantages of a three axes-in-one block device and can render the design inappropriate for single use applications, such as guided missiles, where the premium is on economy and accuracy is not critical.

SUMMARY

The substantial task of designing an integrated triaxial multioscillator ring laser rotation sensor of the type in which a predetermined axial magnetic field is applied to each of the lasing cavities is addressed by the present invention that provides apparatus for imposing predetermined axial magnetic fields to three lasing cavities arranged to measure rotation about three orthogonal axes so that the gain of each of said cavities is manipulated in a predetermined manner. The device provides an integral frame that includes three (3) internal cavities, each comprising four (4) intersecting cavity segments. Each of the cavities is arranged to include a segment parallel to that of each of the other two cavities. Such three parallel segments are equally spaced about a circle whose center coincides with the central axis of the frame.

A case is provided that includes means for establishing a magnetic field within the case of substantially parallel lines of flux. The case additionally includes means for positioning the frame so that the predetermined parallel cavity segments are simultaneously aligned with the lines of magnetic flux.

The foregoing and additional features and advantages of this invention will become further apparent from the detailed description that follows. The written description is accompanied by a set of drawing figures. Numerals of the figures correspond to those of the written description, like numerals referring to like features of the invention throughout.

DETAILED DESCRIPTION

Figure 1:
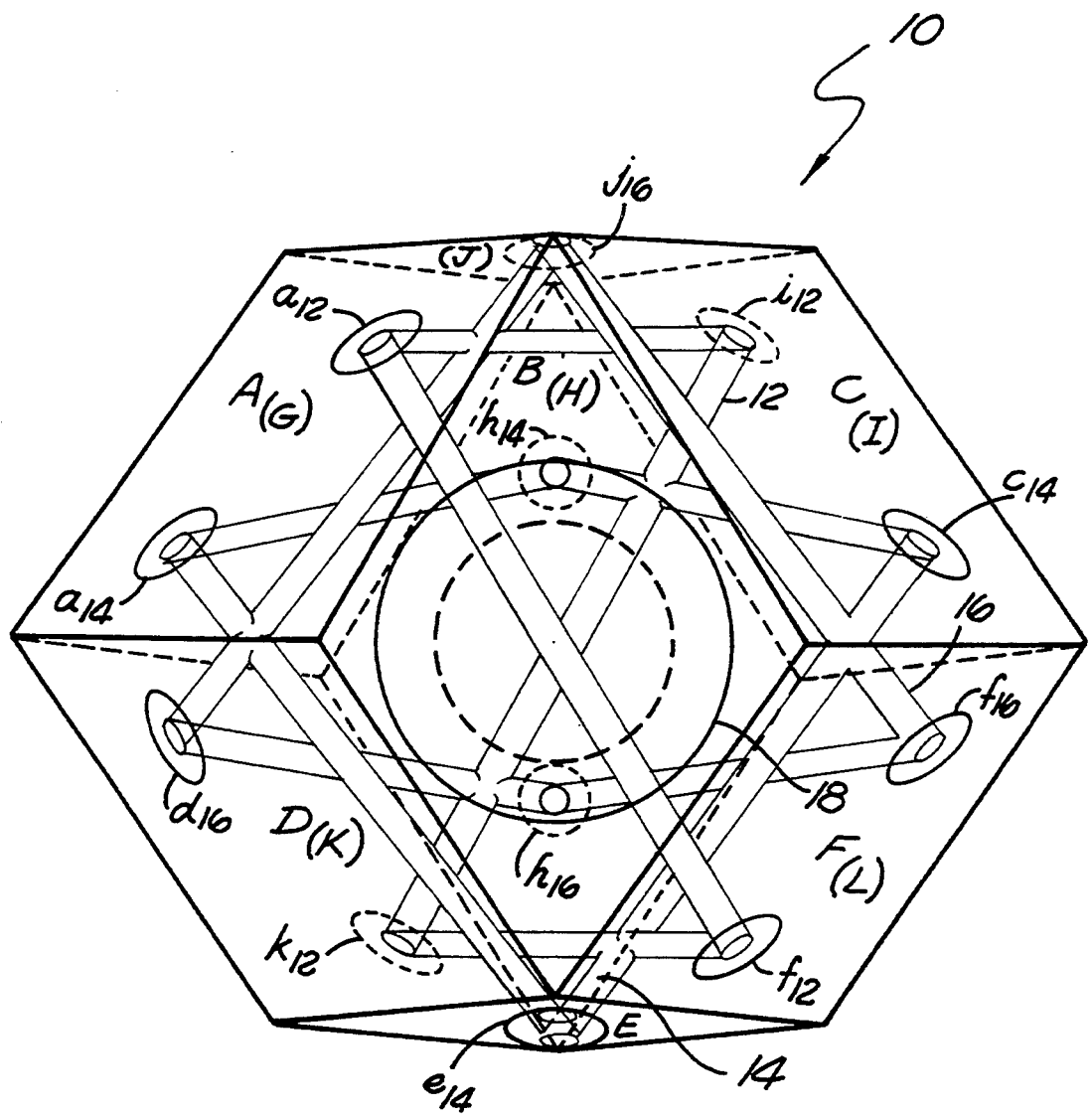
FIG. 1 is a perspective view of the rhombic dodecahedral shaped frame for a triaxial multioscillator illustrating the associated arrangements of lasing cavities and mirror faces.

FIG. 1 is a perspective view of a rhombic dodecahedral-shaped frame 10 for a triaxial multioscillator showing the associated arrangements of lasing cavities and mirrors. Such a basic geometry for a multioscillator frame is disclosed in U.S. Pat. No. 4,795,258 of Graham J. Martin entitled "Nonplanar Three-Axis Ring Laser Gyro With Shared Mirror Faces". That patent is the property of the Assignee herein. The frame may be formed of an appropriate glass ceramic (such as those commercially available under the trademarks "CERVIT" and "ZERODUR") or the material sold under the trademark "PYREX" is characterized by a total of twelve (12) planar surfaces.

The faces of the frame are designated by numerals A through L to facilitate the description of the orientation of elements therein for the written description. In the figure, dashed lines illustrate the surfaces of the frame that face into the paper and away from the viewer. Furthermore, the notations of those surfaces are in parentheses. Accordingly, letters A, B, C, D, E, and F are positioned inside surfaces bordered by solid lines that face the reader while the letters G, H, I, J, K, and L are internal to surfaces of the frame 10 that are bordered by dashed lines and face away from the viewer.

Three independent, clear-path closed cavities 12, 14 and 16 are located within the frame 10. Each of these non-planar cavities comprises four straight segments that intersect adjacent mirror faces fixed to the various surfaces of the frame 10 to form continuous passageways for pairs of counterpropagating beams.

A mirror is positioned adjacent each intersection of cavity segments for re-directing the counterpropagating beams within the cavities. A total of twelve (12) mirrors is employed, four (4) associated with each of the three (3) cavities. Three of the surfaces (surfaces A, F and H) provide faces for mounting a pair of mirrors, each mirror of a mirror pair being associated with a different internal cavity while six (6) surfaces (C, D, E, I, J and K) serve for mounting a single mirror. Three of the surfaces (B, G and L) are reserved for the mounting of getters and an internal cathode.

Each of the cavity mirrors is denoted in FIG. 1 by a lower case letter that corresponds to its mounting surface. Furthermore, when a single surface serves for mounting more than one mirror, each of those mirrors is denoted by a subscript that corresponds to the numeral identifying the lasing cavity with which it is associated. For example, the mirror "$a_{12}$" is mounted to surface A and serves to redirect light propagating about the lasing cavity 12 while the mirror "$a_{14}$" is also mounted on surface A but serves to direct light traveling about the cavity 14.

Figure 2:
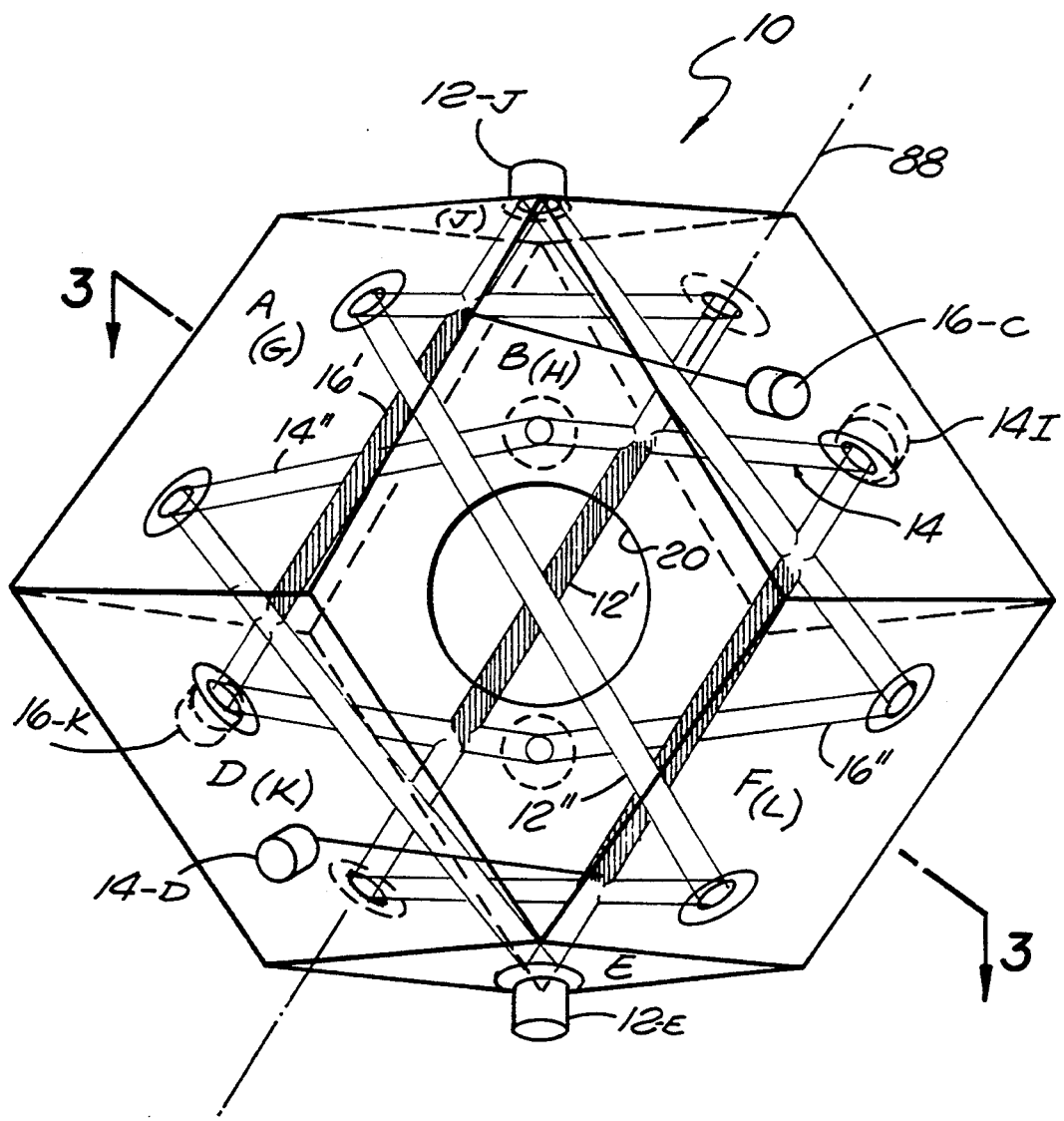
FIG. 2 is a perspective view of the multioscillator frame illustrating the electrode arrangements and the resultant gain regions within the three lasing cavities.

FIG. 2 is a perspective view of the multioscillator 10 that illustrates the arrangement of electrodes associated therewith and the resulting gain regions within the lasing cavities 12, 14 and 16. For the purposes of this figure, a glass ceramic plug 18 has been removed, exposing the aluminum-coated surface of the internal cathode 20.

A total of six (6) anodes is located at the surfaces of the frame 10, pairs of which are in communication through bores with preselected individual segments of each of the three internal cavities. The designated segments of the independent lasing cavities also communicate (through bores) with the internal cathode 20. Such designated segments contain the gain for each of the cavities and are indicated in FIG. 2 by the numerals 12', 14' and 16' corresponding to the cavity designations previously provided. It is a property of the arrangement of cavities within a rhombic dodecahedron as illustrated in FIGS. 1 and 2 that the twelve light path segments may be collected into four groups of three parallel segments. Furthermore, the segments of one of such groups are equally spaced on the circumference of a circle whose center is coincident with the long axis 88 of the frame 10. The symmetry of such a bore set makes it an ideal choice for imposition of a single magnetic field that simultaneously satisfies the axial field requirement for split gain operation in each of the three lasing cavities. Furthermore, as will become particularly apparent with reference to FIG. 3, the symmetrical placement of the anode bores adjacent opposed ends of the cavity segments 12', 14' and 16' result in a "no net flow" condition that minimizes Fizeau-Fresnel effects otherwise occasioned by gas flow within the gain region.

Each anode is fixed to the closest surface to minimize the required bore lengths. (The bores are shown symbolically in FIG. 2 by straight lines.) An anode notation is adopted to facilitate a complete understanding of the electrode geometry. In it, each anode is denoted by a numeral that corresponds to the lasing cavity with which it communicates followed by a letter designating the surface upon which it is fixed. The bores that connect the ends of the three designated cavity segments to anodes are not separately designated. As can be seen, gain regions, indicated by shading, are established in the designated cavity segments 12', 14' and 16' which, as described above, are mutually parallel and equally spaced on the circumference of a circle centered at the long axis of the frame 10.

The existence of the gain region within the designated segments follows from the fact that each of said segments also communicates through a bore with the internal cathode 20. Bores 22 (shown as a point in FIG. 2) 24 and 26 (shown as lines) connect the interior of the cathode 20 with the mid-points of the cavity segments 12', 14' and 16', respectively. By tapping the mid-points of the selected segments, equal and opposite current flows are established in the discharge regions within those segments providing a cancellation of the Fresnal-Fizeau effects associated with a net ion flow.

Figure 3:
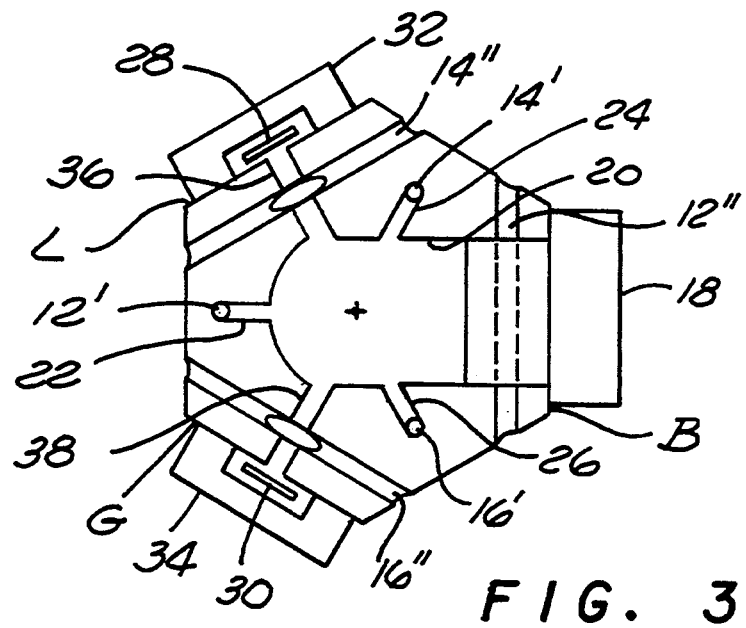
FIG. 3 is a cross-sectional view of the multioscillator frame of the invention taken at line 3—3 of FIGS. 1 and 2.

FIG. 3 is a cross-sectional view of the multioscillator frame 10 taken at line 3—3 of FIG. 1 and of FIG. 2. The orientation and shape of the internal cathode 20 are apparent in this view. Furthermore, the angular orientations of the bores 22, 24 and 26 are shown.

In addition to the features described with reference to the preceding figures, getters 28 and 30 comprising barium-coated spring-mounted frames, are enclosed within glass ceramic caps 32 and 34 respectively that have been omitted from the prior figures, are shown. The getter caps 32 and 34 are fixed to the surfaces L and G of the frame 10 respectively. Bores 36 and 38 connect the getters with the cathode 20. The bores are collinear with the cathode bores 26 and 24 and consequently may be machined therewith. The nature of the geometry of the internal bore structure accordingly minimizes manufacturing complexity.

Figure 4:
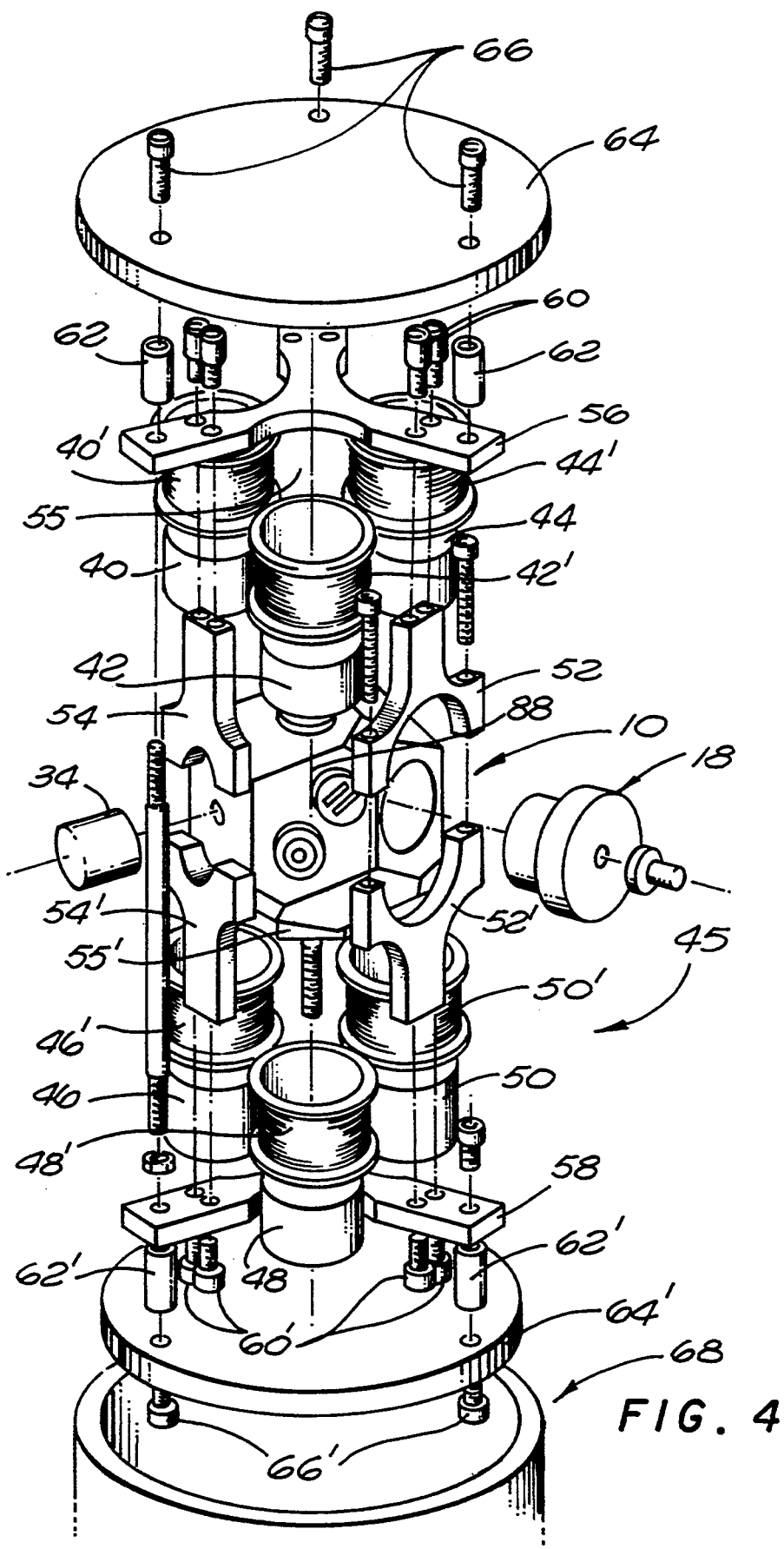
FIG. 4 is an exploded perspective view of the mechanical casing of the multioscillator frame of the invention.

FIG. 4 is an exploded perspective view of a mechanical fixture and casing for mounting the multioscillator frame 10. The fixture comprises an assemblage that includes an upper magnetic field generation assembly 39 that includes equally spaced permanent magnets 40, 42 and 44, each of which has an associated field coil indicated by the corresponding primed numeral. The elements of the upper magnetic field generation assembly 39 are aligned with those of a lower magnetic field generation assembly 45 that comprises equally spaced lower permanent magnets 46, 48 and 50, each again having an associated field magnet indicated by primed numeral. In combination, the aligned upper and lower assemblies provide a substantially uniform magnetic field for shifting the centers of the gain curves in frequency, as required for operation of a multioscillator with mode suppression. The bulk of the magnitude of the field (about 413 Gauss for a 20 cm path length) is provided in each of the three cases by the permanent magnet while the associated field coil produces a relatively small, adjustable field for "fine tuning".

The gyro frame 10 is held and aligned between a pair of support posts 52 and 52' that grasp it by the periphery of the cathode plug 18. (As discussed supra, the frame 10 is aligned so that the axis 88 thereof is vertical.) The getter caps 32, 34 are held somewhat more loosely by aluminum support posts 54, 54' and 55, 55'. As mentioned, the upper and lower magnetic field assemblies 39 and 45 are comprised of symmetrically spaced elements. That is, there is an angular separation of 120° degrees between each of the adjacent permanent magnet-and-field coil arrangements of each assembly. This spacing is secured by means of an upper yoke 56 and a lower yoke 58, each formed of a non-magnetic material such as aluminum and including three generally-radially, equally-spaced arms. Arcuate indentations span the regions of intersection between the arms and provide a means for maintaining the desired angular spacings between the cylindrical permanent magnet-and-filed coil assemblies.

Screws 60 fix the arms of the upper yoke 56 to the support posts 52, 54 and 55 while screws 60' similarly fix the arms of the lower yoke 58 to the lower support posts 52' 54' and 55' respectively. Spacers 62 and 62' rest atop the upper yoke 56 and the lower yoke 58 respectively providing separations between an upper disk-like plate 64 and a lower disk-like plate 64'. Each of such plates is fabricated of soft iron for accommodating the large magnetic flux generated by the permanent magnet-and-field coil arrangements. The plates 64 and 65 are secured to the fixture by means of upper screws 66 and lower screws 66' respectively and the fixture as assembled is enclosed and contained within a cylindrical casing 68 of soft iron fabrication that provides return path of large magnetic susceptibility for the flux generated by the upper and lower magnet field generation assemblies 39 and 45.

Figure 5:
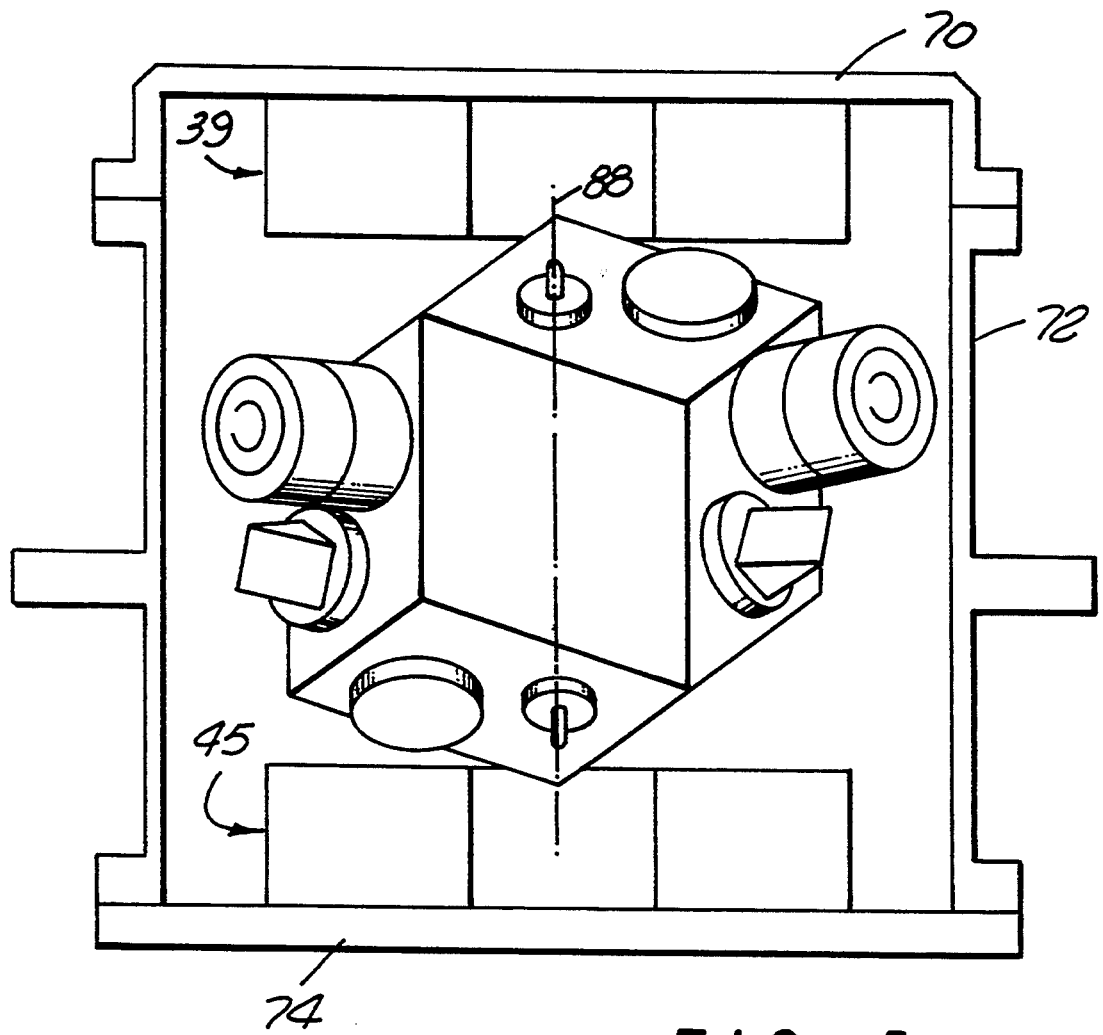
FIG. 5 is the simplified view of the assembled casing for illustrating the resultant orientation of the multioscillator frame therein.

FIG. 5 is a simplified view of the multioscillator frame 10 within the casing 68 for illustrating its orientation relative to the upper and lower magnetic field generation assemblies 39 and 45. The casing 68 includes a top 70, a cylindrical wall 72 and disk-shaped bottom 74, each fabricated of soft iron that form, in combination, a continuous return path for the lines of magnetic flux generated by the assemblies 39 and 45. (The fixture for preferentially supporting the frame 10 within the casing is omitted in FIG. 5 for purposes of clarity.) By comparing the orientation of the frame 10 as shown in FIG. 5 with that of FIG. 2, it is seen that the selected cavity segments 12', 14' and 16' are mutually aligned vertically within the casing as the frame 10 is held therein by the fixture so that its axis 88 is vertical. Furthermore, since these predetermined cavity segments are equilaterally disposed about the axis 88 of the dodecahedral frame 10 (i.e. spaced by 120° degrees about a circle perpendicular to the axis 88), the fixture is easily configured as in FIG. 4 to hold the frame 10 so that each of the three predetermined cavity segments is simultaneously aligned with vertically-directed lines of magnetic flux generated by one of the three sets of upper and lower permanent magnet-and-field coil pairs that is held in like orientation by the fixture.

Figure 6:
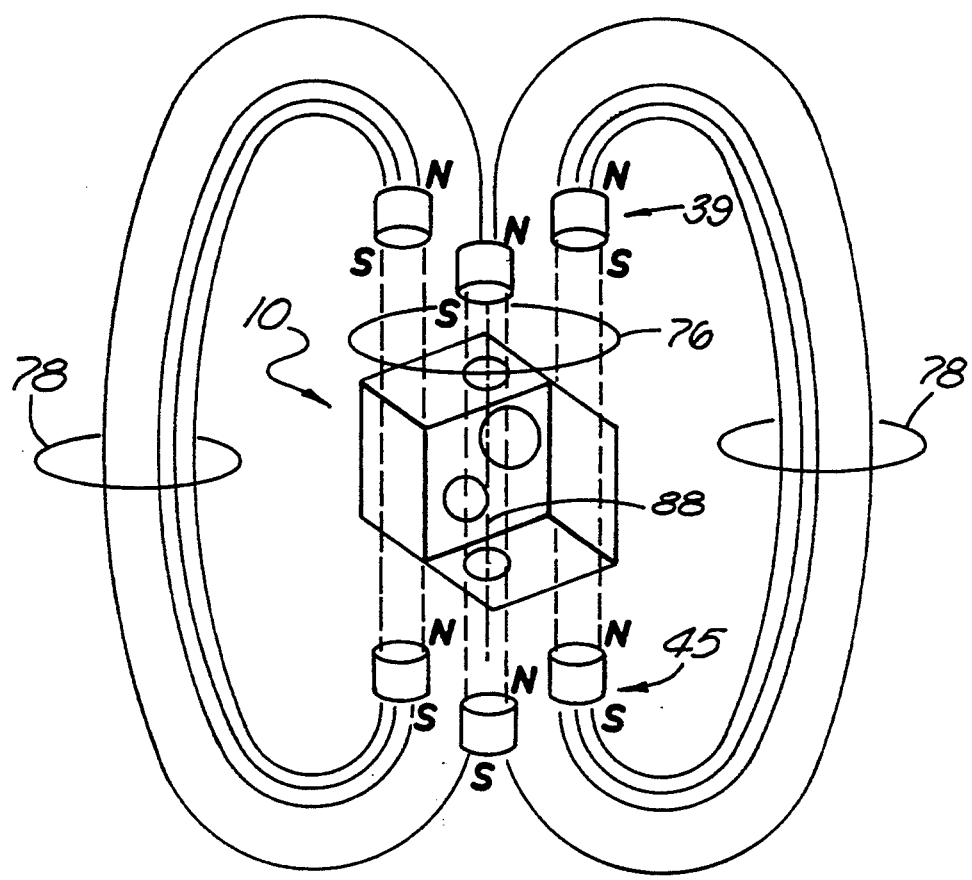
FIG. 6 is a schematic view that illustrates the interaction between the imposed magnetic fields and the multioscillator frame within the casing.

FIG. 6 is a schematic view that illustrates the field interactions that take place within the casing between the imposed magnetic fields generated by the sets of permanent magnet-and-field coil assemblies and the multioscillator frame 10. Each of the magnet-and-field coil arrangements of the upper and lower magnetic field generator assemblies 39 and 45 is aligned as shown so that vertically oriented groupings of lines of magnetic flux 76 in free space are simultaneously aligned with the predetermined cavity segments 12', 14' and 16'. Accordingly, the requisite imposition of a uniform axial magnetic field upon the gain region is simultaneously achieved in each of the lasing cavities 12, 14 and 16. The soft iron composition of the casing 68 which confines flux line continuations 78 assures that the axial magnetic fields are strong and uniform in the gyro frame region.

Figure 7:
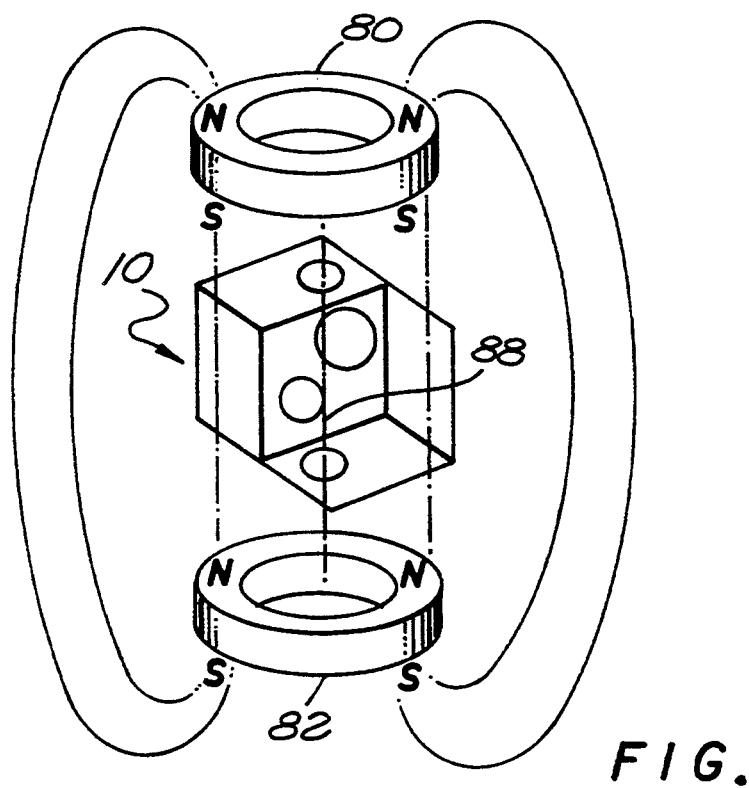
FIG. 7 is a schematic view of the interaction between the imposed magnetic fields and the multioscillator frame in accordance with an alternative embodiment of the invention.

FIG. 7 illustrates the interaction between the magnetic field within the casing 68 and the multioscillator frame 10 in accordance with an alternative embodiment of the invention. In the embodiment of FIG. 7, the upper and lower magnetic field generation assemblies comprise ring-like magnet-and-field coil assemblies 80 and 82 fixed adjacent the top and bottom of the casing 68. The ring geometry of the alternative embodiment functions is substantially the same way as the assembly of the prior embodiment. However, due to the continuous geometries and corresponding magnetic fields of the arrangement of FIG. 7, the frame 10 of the multioscillator requires no particular orientation in the horizontal plane. Rather it need only be aligned so that the axis 88 is vertical to assure that axial magnetic fields are aligned with the gain regions of each of the cavities 12, 14 and 16. As a consequence, the design of a fixture for properly positioning the frame within the container is somewhat simplified. This type of design is more amenable to shorter path length frames. Of course, while the embodiments of FIGS. 6 and 7 will function to a greater or lesser extent even when the segments 12', 14' and 16' are not precisely aligned with the three pairs of magnet-and-field coil assemblies (i.e. the axis 88 is not exactly vertical), optimum operation and control for shifting the multioscillator gain curves in frequency is only achieved when the selected segments are precisely aligned.

Thus, it is seen that the present invention provides a compact and relatively-simple apparatus and method for measuring rotations about three orthogonal axes in accordance with the mode of operation of a multioscillator such as that disclosed in pending U.S. patent application Ser. No. 115,018 that requires the imposition of a substantially uniform axial magnetic field on the gain region of the ring cavity. By employing the teachings of this invention, one can simultaneously impose substantially uniform axial magnetic fields on the gain regions of each of three independent lasing cavities so that the necessary shifting of the centers of the gain curves in frequency to effect mode suppression is independently achieved. By employing the invention, the operational criterion of a uniform axial magnetic field is simultaneously satisfied with respect to each of the three non-planar multioscillator cavities. The invention avoids the use of cut out regions in the frame and six-post magnet arrangements for encompassing the gain region with the correct field.

While this invention has been described with reference to its presently preferred embodiment, it is not limited thereto. Rather, this invention is limited only insofar as defined by the following set of claims and includes all equivalents thereof.

What is claimed is:

1. Apparatus for imposing uniform axial magnetic fields on three lasing cavities arranged to measure rotation about three orthogonal axes comprising, in combination:
   a) an integral frames for containing three internal lasing cavities;
   b) each of said internal cavities comprising four substantially straight, intersecting cavity segments;
   c) said cavities being arranged so that each of said cavities includes a segment that is parallel to a segment of each of the other two cavities and so that said three parallel segments are equally spaced about a circle whose center coincides with the central axis of said frame;
   d) a case, said case including means for forming a magnetic field having substantially parallel lines of flux therein; and
   e) said case further includes a fixture for positioning said frame so that said three parallel segments are preferentially aligned with respect to said lines of flux.

2. Apparatus as defined in claim 1 wherein said frame is a rhombic dodecahedral shape.

3. Apparatus as defined in claim 2 further including means for generating a gain medium in each of said three parallel segments.

4. Apparatus as defined in claim 3 wherein said means for generating a gain medium further comprises:
   a) a cathode, said cathode comprising a hollowed-out interior portion of said frame having an internal coating of metallic cathode material;
   b) six anodes, said anodes being fixed to preselected surfaces of said dodecahedral frame;
   c) six anode bores, each of said anode bores providing communication between the interior of one of said anodes and one of said three parallel segments; and
   d) three cathode bores, each of said cathode bores providing communication between said internal said cathode and the mid-point of one of said three parallel segments.

5. Apparatus as defined in claim 4 further characterized in that the intersections between each pair of anode bores and each of said three parallel segments are located substantially symmetrically with respect to each of said parallel segments.

6. Apparatus as defined in claim 5 wherein each of said intersections between said parallel segments and said anode bores is located adjacent the intersection of another segment.

7. Apparatus as defined in claim 6 wherein said case further comprises:
   a) a closed cylindrical element of soft iron; and
   b) said fixture is located interior to said element for positioning said frame in accordance with a predetermined orientation.

8. Apparatus as defined in claim 7 wherein said fixture further comprises means for mounting at least one magnet adjacent the top and the bottom of the interior of said element.

9. Apparatus as defined in claim 8 wherein said at least one magnet comprises a permanent magnet and a field coil.

10. Apparatus as defined in claim 9 further comprising:
   a) three magnets arranged adjacent the top of said closed cylindrical element;
   b) three magnets arranged adjacent the bottom of said closed cylindrical element;

c) said magnets adjacent said top of said element are aligned with said magnets arranged adjacent the bottom of said element; and d) said magnets arranged adjacent the top of said element are separated by 120 degrees and said magnets adjacent the bottom of said cylindrical element are separated by 120 degrees about the axis of said cylindrical container and said sets of upper and lower magnets are mutually aligned.

11. Apparatus as defined in claim 9 wherein said magnet further comprises:

a) a ring-shaped magnet adjacent the top of and interior to said closed cylindrical element; and b) a ring-shaped magnet arranged adjacent the bottom of and interior to said cylindrical container.